Patented Oct. 24, 1950

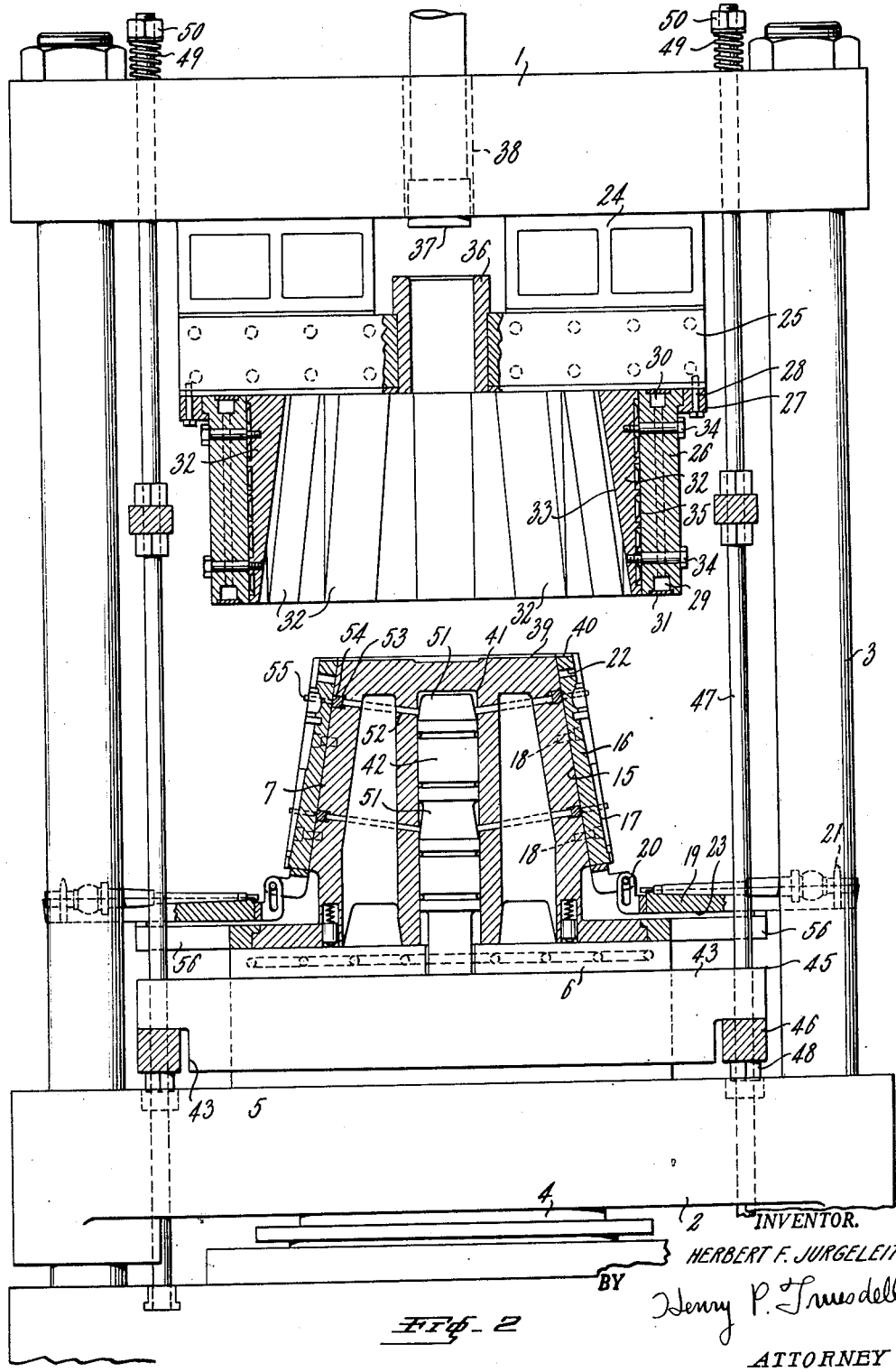

2,526,877

UNITED STATES PATENT OFFICE 2,526,877

MOLDING APPARATUS

Herbert F. Jurgeleit, Oceanside, N. Y., assignor to United States Rubber Company, New York, N. Y., a corporation of New Jersey Application March 26, 1947, Serial No. 737,316

8 Claims. (Cl. 18—30)

My invention relates to molding apparatus. More particularly it relates to an apparatus for molding a plurality of articles at the same time and to an arrangement for increasing the number of articles which may be molded in a press of any particular capacity.

In one form of molding apparatus now in commercial use, a plurality of individual molds are mounted between the upper and lower crossheads of a hydraulic press and the crossheads moved together to apply heat and pressure to the molds to accomplish the molding operation. Manifestly, the number of individual molds which can be mounted in any one press is limited by the size or area of the crosshead which supports the molds and also by the pressure rating of the press. This limits the output of the apparatus. However, I have found that it is possible to increase the number of molds to be used with an individual press by disposing the molds at a substantially vertical angle with respect to the supporting crossheads. In one form of the invention the arrangement is such that the individual molds are grouped around an element shaped as a frustum of a pyramid and which has a supporting surface to hold them at an angle to the crossheads. At the same time, the arrangement is one which makes the molds easily and quickly accessible for cleaning and stripping the completed article.

Therefore, it is an object of my invention to provide a new and improved molding apparatus so arranged as to increase the number of individual molds which can be used with a given size press.

It is another object of my invention to provide a new molding apparatus for mounting individual molds at an angle to the crosshead of a press whereby the number of molds is increased and the output per press increased correspondingly.

Still another object of my invention is the provision of molding apparatus utilizing individual molds in which the molds are arranged for rotation on a vertical axis so that they may be easily and quickly serviced.

A further object of my invention is to provide a new molding apparatus for mounting a plurality of molds at an angle to the crosshead of a press together with means for automatically separating the parts of the mold upon movement of the crosshead to unloading position.

In the accompanying drawing:

Fig. 2 illustrates the molding apparatus of Fig. 1 in open position.

Figure 1:
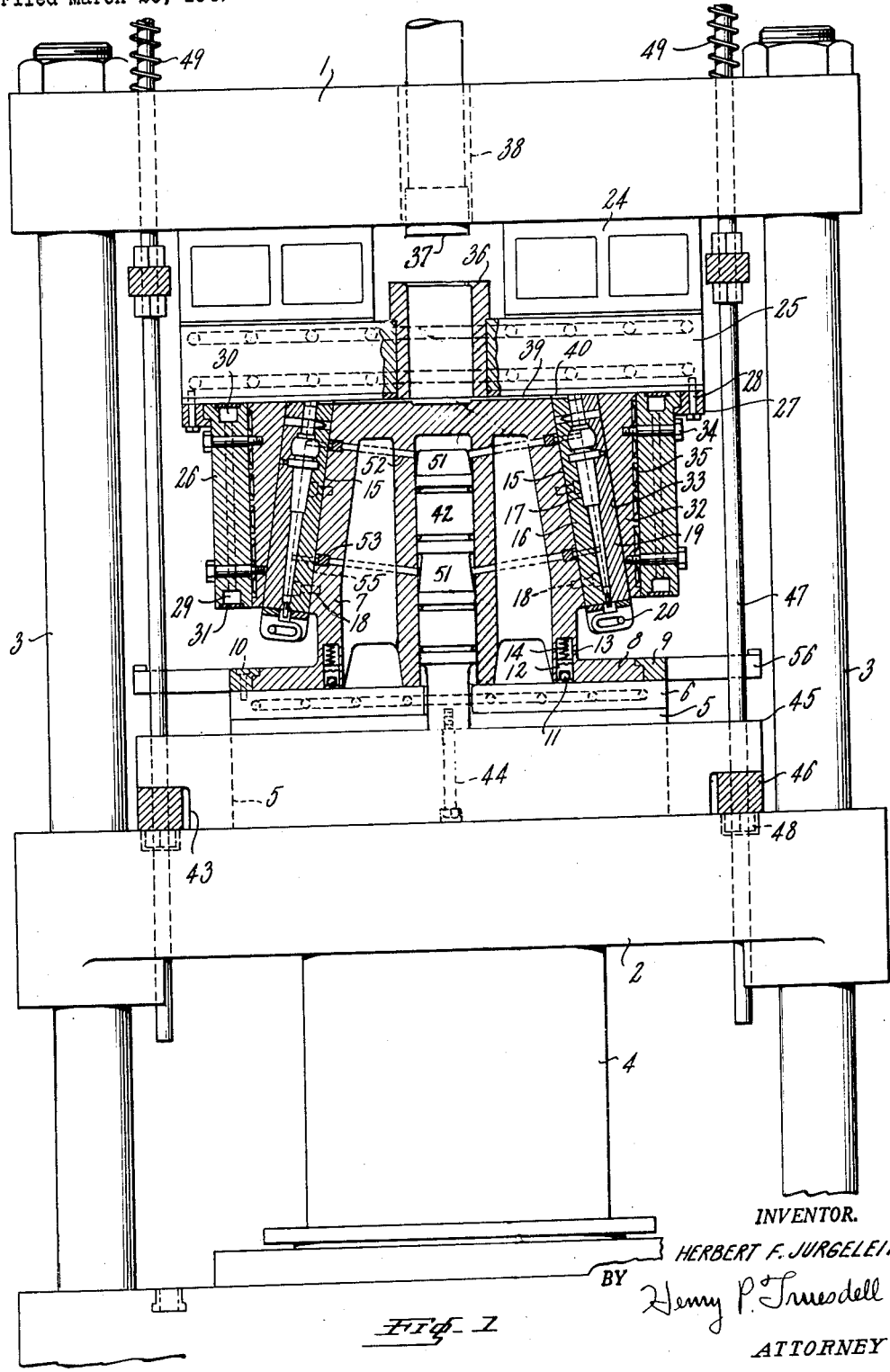
Fig. 1 illustrates the molding apparatus of my invention showing the apparatus in closed position during the molding operation.

Referring to the drawing, Fig. 1 illustrates a molding apparatus constructed in accordance with my invention and which includes upper and lower crossheads 1 and 2, respectively, the lower crosshead being movable toward the upper one along tie rods 3 by means of a hydraulic ram 4. The lower crosshead carries two spaced blocks 5 supporting a heating platen 6 which, in turn, carries a turret 7. In the form of the invention illustrated the turret 7 is designed as the frustum of a pyramid so that it is provided with a plurality of inclined surfaces. It should be manifest, however, that other forms of turret may be used such as the frustum of a cone, it being only necessary that a body of sufficient size be used to provide a relatively large perimeter to accommodate a plurality of molds in a manner to be described later. The turret is provided with a flange 8 forming a support which rests on the heating platen 6 and which permits rotation of the member within a confining ring 9 fastened to the platen by bolts 10. Rotation of the turret is facilitated by a series of ball bearings 11 set in retaining cups 12 and which travel in recesses 13 in the body of the turret. Springs 14 bias the ball bearings into engagement with the heating platen 6 to support the turret. The arrangement is such that the turret may be easily rotated on the platen around a vertical axis for stripping and cleaning of the individual molds.

The turret 7 is provided with a plurality of flat surfaces 15 extending around the periphery thereof and which are adapted to mount a plurality of individual molds 16 having cavities therein. The number of molds disposed around the periphery of the turret will be determined by the diameter of the turret and the size of the mold; in the form of the invention illustrated, 12 of the mold members 16 are employed and they are mounted on a corresponding number of flat surfaces. It should be noted that the flat surfaces 15 extend at an angle with respect to the heating platen 6 and that they are located almost in a vertical plane. In the form of the invention illustrated the surfaces extend at an angle of approximately eight degrees (8°) to the vertical although it should be manifest that the invention is not limited to any particular angle. Inasmuch as the turret 7 extends upwardly for a considerable distance above the surface of the platen 6, a group of comparatively long molds 16 may be located around the turret on the flat sides 15. In this way a considerable number of individual molds may be accommodated on the molding apparatus since they are located at a steep angle to a horizontal plane. The number of molds which may be so arranged is considerably in excess of the number which would be accommodated in the molding apparatus if the molds were arranged in a horizontal plane by simply resting them on the surface of the platen 6. In addition, the arrangement is such that only a small portion of the forces used to inject molding compound into the molds will be transmitted to the press ram 4; this feature of the invention will be more fully described hereafter.

Each mold member 16 is illustrated as being of a two-part construction although other mold constructions may be used. It is provided with an inner half 17 secured to the flat face of the turret by means of a plurality of cap screws 18. The outer half 19 of the mold is pivoted to the inner half by means of a pin and slot connection 20 and may be rotated from a position in which it mates with the inner half, as shown in Fig. 1, to an open position in which it is horizontal, as shown in Fig. 2. When the outer half of the mold is moved into engagement with the inner half, the parts are correctly positioned by means of a guide pin 21 which seats itself in a corresponding guide opening 22 in the inner half 17. The arrangement is such that the mold may be easily and quickly separated for removal of the molded part and for cleaning and inspection of the cavity surfaces. In the form of the mold illustrated, the cavity surfaces are designed for molding a milking inflation for use on milking machines. However, it should be manifest that the mold cavities may be designed to manufacture any particular item and that the present invention is not limited to any particular molded part.

In order to hold the two parts of the mold in closed position during the molding operation, the upper crosshead is provided with means which bears against the outer surfaces 23 of the outer mold half 19. To this end, the upper crosshead 1 is provided with a spacing support 24 which, in turn, carries an upper heating platen 25 fastened thereto in any well known manner. A supporting ring 26 is carried by the upper platen and is fastened thereto in any suitable way, as by a lock ring 27 fastened to the platen by bolts 28. The ring 26 is provided with upper and lower manifolds 29 and 30, respectively, sealed by plates 31 and which are connected to a steam supply for heating the ring by means of steam passages during the molding operation. The ring 26 supports a series of wedges 32 the number being determined by the number of individual molds carried by the lower turret 7. Each wedge is provided with an inner beveled or inclined surface 33 which is adapted to engage the outer surface 23 of the individual mold. Each wedge member is secured to the ring 26 by a plurality of bolts 34, the bolts being tightened to an extent which permits a limited amount of movement or play between the wedge 32 and the supporting ring 26. A series of spring washers 35 are interposed between the wedge and the supporting member and serve to permit alignment of the individual wedges with the individual molds so that when the molds are moved into engagement with the wedges a uniform high pressure is exerted along the surfaces of the individual molds. The spring washers provide a slight adjustment of the parts to compensate for manufacturing tolerances; they also assure a seal at the parting lines of the molds.

Any suitable molding compound, such as rubber, is injected into the individual molds by means which include a cylinder 36 secured in the upper platen 25 and which cooperates with a piston 37 extending through an opening 38 in the upper crosshead. The piston is operated by means of any conventional hydraulic mechanism (not shown). In order to feed molding compound to the individual molds the upper surface of the turret 7 is provided with a plurality of radially extending channels 39, which are in alignment with corresponding channels 40, formed in the ends of the mold members. As will be apparent from Fig. 1, molding compound placed in the cylinder 36 will be forced outwardly along the channels 39 and 40 into the cavities in the individual molds. After the mold cavities have been filled the compound is cured under heat and pressure for any proper and predetermined time interval.

After the curing cycle has been completed, the apparatus is provided with means for separating the mold parts to permit removal of the completed article. To this end, the turret 7 is provided with a central chamber or passageway 41 for receiving a plunger 42. The plunger extends through an opening in platen 6 and is fastened to a support 43 in any suitable manner, as by a bolt 44. The support 43 is provided with extending ears 45 at opposite ends which overlie bars 46 carried by a plurality of lift rods 47. The bars 46 rest on nuts 48 threaded onto the lift rods so that as the support 43 moves downwardly when the ram 4 is lowered it will rest on and be held by the bars 46. Any shock transmitted to the lift rods 47 is absorbed by springs 49 carried at the upper ends thereof and disposed between the crosshead 1 and an outer lock nut 50. Inasmuch as the upwardly extending plunger 42 is carried by the support 43 and the turret 7 is carried by the spaced supports 5, between which the support 43 extends, the arrangement is such that the plunger 42 moves up and down in the passageway 41. The plunger is provided with a plurality of beveled surfaces 51 which cooperate with knock-out rods 52. It will be apparent that one end of each knock-out rod 52 cooperates with and rides along the corresponding beveled surface 51; the other end of the rod engages an equalizer bar 53. Bar 53 rests in a corresponding recess or groove 54 in the flat surface 15 and is adapted to engage and move a plurality of knock-out pins 55 extending through the inner half of the mold members on opposite sides of the cavity in the mold.

When the knock-out rods 52 are moved outwardly by upward movement of the plunger 42 relative to the turret 7, they engage the equalizer bars 53 to move them outwardly along with the knock-out pins 55. Since the pins 55 bear against the outer half 19 of the individual mold members, the pins act to separate the outer half from the inner half of the mold. Outward movement of the outer half of the mold is permitted by the pin and slot connection 20 which hinges the halves together. It will be apparent that additional pins 55 can be provided to eject or loosen the molded part of the mold. To remove the molded article, the outer half of the mold is pivoted to a horizontal position, as shown in Fig. 2, where it rests on an arm 56 extending outwardly from the lower platen 6. An arm is provided for each one of the mold members. Although only two sets of knock-out rods 52 are shown by the drawing, it will be apparent that the rods are arranged completely around the periphery of plunger 42 in number sufficient to operate all the individual mold members.

In operation of the apparatus, the two halves of the individual mold members are closed together and power is applied to the press so that the ram 4 moves the lower crosshead 2 toward the upper crosshead 1. Since the parts are initially in the position shown by Fig. 2, the lower crosshead 2 moves the suporting blocks 5, the lower platen 6, and the turret 7 upwardly relative to the plunger 42. Since the plunger is carried on the support 43 resting on bars 46, the plunger, in effect, is moved downwardly in the channel 41 moving the beveled surfaces 51 out of engagement with the knock-out rods 52. Further upward movement of the crosshead 2 causes the crosshead to engage the supporting member 43 to lift it off the bars 46 so that all the parts carried by the lower crosshead are moved as a unit toward the upper crosshead. Continued upward movement of the crosshead causes the turret and the individual mold members 16 to enter the space within the ring 26 so that the inner surfaces 33 of the respective wedges 32 rest against and engage the outer surfaces 23 of the corresponding individual molds. Sufficient pressure is applied by the ram 4 to move the individual mold members tightly into engagement with the respective wedges 32 and to force the top surface of the turret 7 into seated engagement with the lower surface of the upper platen 25. As pointed out in the preceding paragraphs, the series of spring washers 35 between the wedges 32 and the ring 26 permit the individual wedges to align themselves with the corresponding individual molds so that the outer halves of the molds are held firmly in seated position. Inasmuch as the individual molds themselves are disposed at an angle along the surface 15 and are engaged by the inclined inner surface 33 of the individual wedges 32 the two parts of the molds are clamped together by the wedging action imposed by the inclined surfaces. This moves the knock-out rods 52 inwardly so that they extend into the passageway 41 where they occupy space provided by retraction of the beveled surfaces 51.

After the individual molds are in proper seated position, as shown in Fig. 1, a biscuit of rubber, or other suitable moldable material, is placed in the cylinder 36 and the piston 37 moved into the cylinder to force the moldable material outwardly along the channels 39 and 40 into the cavities in the individual molds. The injected material is then cured within the cavities. During the curing cycle, heat is applied by means of the steam channels existing in the upper and lower platens 25 and 6 respectively; also, high temperature steam is passed through the manifolds 29 and 30 in the ring 26 to heat it and the wedges 32. After the curing cycle has been completed the lower crosshead is moved downwardly away from the upper crosshead to separate the two parts of the press.

As the crosshead 2 moves downwardly the outer surfaces of the individual molds break away easily from the inclined inner surfaces 33 of the wedges. As the lower crosshead 2 continues its downward movement it reaches a point at which the support 43 is picked up and rests on the bars 46. Further downward movement of the crosshead results in the bars 46 lifting the support 43 off of the crosshead so that as the blocks 5 supporting the platen 6 and turret 7 continue their downward movement the net result is to move the plunger 42 upwardly within the channel 41. This means that the beveled surfaces 51 engage the knock-out rods 52 and move them outwardly to separate the outer from the inner half of the mold. The completed article is now removed from the mold cavity and the cavity surfaces cleaned before reclosing the mold.

One of the advantages of my invention is that the mold capacity of a particular press is greatly increased by mounting the individual molds in a substantially vertical plane so that a greater number of molds may be utilized in a press of any particular capacity. The construction is one which gives an extremely compact arrangement of the individual molds within the press.

Another important advantage of my invention is that the total force or power required to operate the press may be greatly reduced thereby making it possible to mold the same number of articles with a press of smaller size than that used with conventional molding methods. For example, if the individual molds 16 were mounted in horizontal position on the lower platen 6 and molding compound injected into the molds then the total pressure exerted by the molding compound, which tends to separate the mold parts, would be exerted against the platen 6 and hence this total force would have to be resisted by the hydraulic ram 4. In the construction of my invention, however, the force exerted by the molding compound tending to separate the mold parts is applied to the inclined surfaces of the turret 7 and the wedge shaped members 32; only a small component of this force is exerted downwardly against the lower platen 6 and the ram 4. This means that the amount of power required to hold the upper and lower crossheads of the press together is considerably reduced thereby making it possible to mold the same number of articles with a press of smaller capacity. The high stresses tending to separate the molds, which are developed during the injecting and curing operations, are easily carried and absorbed by the turret 7 and the ring 26. In actual practice, the ring 26 is designed to withstand the total sum of the forces imposed by the individual molds tending to expand the ring. In this way, almost all of the force exerted by the mold members upon injection of the molding compound under high pressure is borne by the ring 26 and turret 7 and is not transmitted to the ram 4. It will be apparent that the closer the inclined surfaces 15 approach a vertical plane the less will be the force exerted on the ram 4.

The turret 7 is freely rotatable on the lower heating platen 6 so that the individual molds are easily accessible for cleaning and removal of the molded article. In the showing of Fig. 2, for the purpose of clarity the outer half 19 of the individual mold has been shown in open condition resting on the support 56 and extending behind the tie rod 3. This does not mean that the turret 7 cannot be rotated when the individual molds are open; rather, rotation of the turret is permitted because the tie rods 3 are located at the four corners of the crossheads 1 and 2 a distance apart sufficient to permit rotation of the turret. By mounting the individual molds on an inclined plane with respect to the horizontal they are easily accessible for inspection and cleaning.

The invention is one which may be easily applied to existing mold equipment simply by mounting the cooperating parts on the upper and lower platen of a conventional press.

Having thus described my invention, what I claim and desire to protect by Letters Patent is:

1. In molding apparatus, spaced supporting members moveable toward one another, a turret having inclined side walls carried by one of said members, a plurality of individual molds supported on the inclined sidewalls of said turret, means carried by the other supporting member and having inclined surfaces for cooperation with the molds, and means for moving the supporting members together whereby the molds are clamped between the inclined surfaces of said first mentioned means and said turret.

2. In molding apparatus, spaced supporting elements at least one being moveable relative to the other, a supporting member carried by one of said supporting elements and having a plurality of surfaces inclined at angles to said element, a plurality of individual molds, one being supported on each of said inclined surfaces, a member having inclined surfaces carried by the other of said supporting elements, means for moving said supporting elements together to clamp the molds between said inclined surfaces and means for injecting moldable material into said molds.

3. In molding apparatus, spaced supporting elements at least one being moveable relative to the other, a supporting member carried by one of said supporting elements and having a plurality of surfaces inclined at angles to said element, a plurality of individual molds, one being supported on each of said inclined surfaces, a ring carried by the other of said supporting elements, a plurality of wedges having inclined surfaces carried by said ring, means for moving said supporting elements together to clamp the molds between the inclined surfaces on said wedges and said supporting member and means for injecting moldable material into said molds.

4. In molding apparatus, spaced supporting elements at least one being moveable relative to the other, a member rotatably mounted on one of said supporting elements and having a plurality of surfaces inclined at angles to said element, a plurality of individual molds mounted on said inclined surfaces, a member having inclined surfaces carried by the other of said supporting elements, means for moving said supporting elements together to clamp the molds between said inclined surfaces and means for injecting moldable material into said molds.

5. In molding apparatus, spaced supporting elements at least one being movable relative to the other, a supporting member carried by one of said supporting elements and having a plurality of surfaces inclined at angles to said element, a plurality of separable individual molds, one being supported on each of said inclined surfaces, a member having inclined surfaces carried by the other of said supporting elements, means for moving said supporting elements together to clamp the molds between said inclined surfaces, means for injecting moldable material into said molds and means operable by relative movement between said supporting elements for separating the parts of the mold.

6. In a molding apparatus, a movable supporting element, a supporting member mounted on said element and having a plurality of surfaces inclined at an angle to said element, a plurality of individual separable molds supported on said inclined surfaces, said member being provided with a passageway, a plunger having bevelled surfaces movable in said passageway, knock-out means cooperating with said bevelled surfaces and adapted to engage one part of the respective molds, and means operable upon movement of said supporting element to move said plunger relative to said supporting member whereby said knock-out means separates the mold parts.

7. In molding apparatus, a fixed part and a crosshead movable relative thereto, a rotatable supporting member having inclined faces carried by said crosshead and having a passageway therein, an individual separable mold on each inclined face of said member, a plunger movable in said passageway and being provided with a bevelled surface, means including slidable rods cooperating with said bevelled surface, said means engaging one part of each mold and means for supporting said plunger and cooperating with said fixed part of the apparatus on movement of the crosshead to move said plunger in said passageway to separate the mold parts.

8. In molding apparatus, spaced supporting elements at least one being movable relative to the other, a supporting member carried by one of said supporting elements and having a plurality of surfaces inclined at angles to said element, a plurality of individual separate molds, one being supported on each of said inclined surfaces, means for injecting moldable material into said molds, a ring carried by the other of said supporting elements and having means engaging the molds to prevent separation thereof upon injection of the moldable material, and means for moving said supporting elements together.

HERBERT F. JURGELEIT.

REFERENCES CITED

The following references are of record in the file of this patent:

UNITED STATES PATENTS

| Number | Name | Date |
| --- | --- | --- |
| 2,292,593 | Amigo | Aug. 11, 1942 |
| 2,325,752 | Dodge | Aug. 3, 1943 |
| 2,330,762 | Tooker | Sept. 28, 1943 |
| 2,358,857 | Gits | Sept. 26, 1944 |